United States Patent [19]
Felger et al.

[11] 3,916,683
[45] Nov. 4, 1975

[54] METHOD AND APPARATUS FOR TESTING THE ACCURACY OF INTAKE AIR MEASUREMENT OF A MOTOR FUEL INJECTION SYSTEM

[75] Inventors: Gunter Felger, Hofingen; Werner Breckel, Wendlingen; Dieter Eichler, Hochberg, all of Germany

[73] Assignee: Robert Bosch GmbH, Stuttgart, Germany

[22] Filed: Oct. 10, 1974

[21] Appl. No.: 513,543

[30] Foreign Application Priority Data
Oct. 19, 1973  Germany.............................. 2352494

[52] U.S. Cl............................................... 73/119 A
[51] Int. Cl.²........................................ G01M 15/00
[58] Field of Search........................... 73/116, 119 A

[56] References Cited
UNITED STATES PATENTS
3,732,492   5/1973   Geal............................ 73/119 A X
3,828,247   8/1974   Kirsch et al................... 73/119 A X Primary Examiner—Jerry W. Myracle
Attorney, Agent, or Firm—William R. Woodward

[57] ABSTRACT

Fuel injection control pulses are supplied to one pulse duration analog converter and pulses of duration representative of engine speed are provided from the interruptor circuit of the igniton system to a second pulse duration analog converter for generation respectively of a d.c. voltage representative of intake air measurement and a d.c. voltage representative of engine speed. These d.c. voltages are supplied respectively to first and second threshold switches, each having two thresholds defining between them a prescribed tolerance range for the test. The fuel injection control pulses are actually intended to be proportional to the quotient of intake air quantity provided by engine speed, but since it is assumed the control pulse generating circuit is working properly, as can be verified by a prior test, and since the test is only valid for a range of engine speed determined by one of the two-threshold switches, for the purpose of the test the injection control pulses are representative of intake air measurement. A third threshold switch assures that the test will be operative only after the engine has reached a minimum normal operating temperature. Logic circuits including flipflops and gates block all test indications unless the engine has a temperature above minimal normal operating temperature and is running at a speed in the prescribed test range and when the latter conditions are fulfilled, the logic gives a "good" indication when the injection control pulse is within the prescribed range and a "bad" indication when it is outside that range.

7 Claims, 1 Drawing Figure

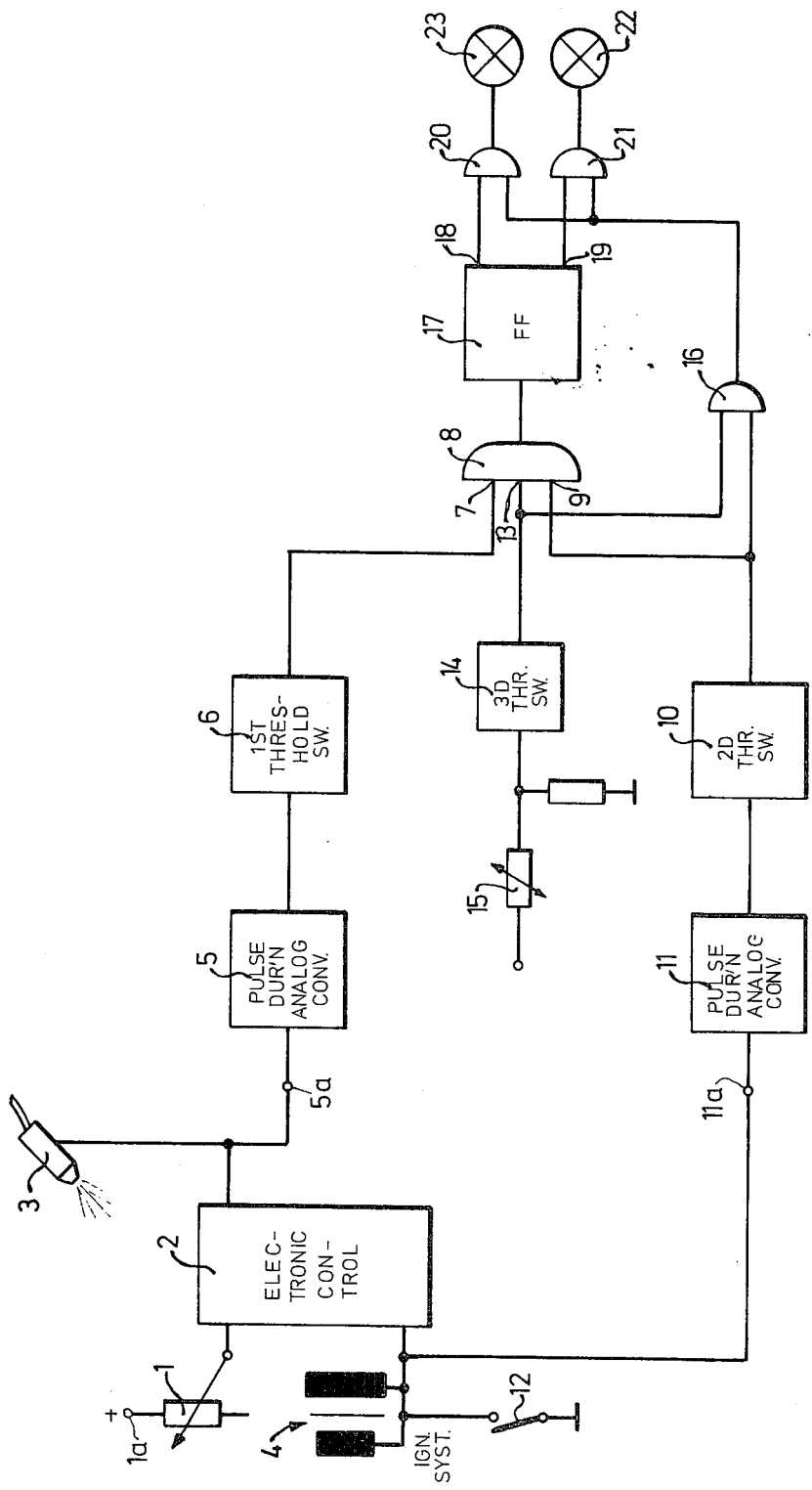

METHOD AND APPARATUS FOR TESTING THE ACCURACY OF INTAKE AIR MEASUREMENT OF A MOTOR FUEL INJECTION SYSTEM

This invention relates to a method and apparatus for testing an air quantity measuring device of a fuel injection type engine which is equipped with an electronic fuel injection control that produces fuel injection control pulses having a duration that varies in response to the quotient of the intake air volume measured by the aforesaid measuring device divided by the speed of the engine. The intake air measuring devices to be tested generally have a displaceable spring-biased flap in the engine intake piping actuated by the air intake suction and flow, arranged to displace the control of a variable resistor to produce an electric signal intended to be representative of the air intake quantity.

In such electronically controlled fuel injection systems that use an air quantity measuring device to determine the fuel-air mixture to be produced by fuel injection, it is essential to be able to test the accuracy and reliability of the air quantity measurement. In the air quantity measuring devices of the type above mentioned in which a flap member is displaced by the air quantity sucked in by the motor and thereby operates a variable resistance, normally connected as a potentiometer, from which a voltage corresponding to the position of the flap is supplied to the electronic control circuit, it can happen that faults in the connections to the potentiometer or faults in the resistance layer of the potentiometer can occur and throw off the measurement. Furthermore, the flap bearing of the air measurement device is not trouble free. When such mechanical or electrical trouble is present, an output signal can be provided to the electronic control circuit that does not actually correspond to the amount of air sucked in by the engine and still is not sufficiently falsified by the errors to lead to obvious engine malfunction or inoperativeness.

It is an object of the invention to provide a method and apparatus by which the intake air measuring device of an engine can be tested without removing the device from the engine or vehicle in which it is installed. The method and the operation of the test apparatus should be as simple as possible and it could well check certain aspects of the electronic control system for fuel injection along with the air intake measuring device.

SUBJECT MATTER OF THE PRESENT INVENTION

Briefly, in a particular speed range of an engine that has already been warmed up to operating temperature, the fuel injection control pulses, which under these conditions should have at least an approximately constant pulse duration, have their pulse duration compared with a standard pulse duration tolerance range, to generate a logic condition signal that has a first value when the pulse duration is within the standard tolerance range and a second value when it is outside the standard tolerance range. In order that the meaningless result of this comparison when the engine is cold or not in the predetermined range of speed may not confuse the personnel operating the test device, logic circuits are provided to block indication of the pulse duration comparison result when the engine temperature is below the minimum normal operating temperature of the engine and likewise whenever the engine speed is outside the predetermined speed range for which the test is valid.

It is desirable that such a test should register both positive and negative results explicitly and for this purpose the pulse duration comparison result is caused to control a flipflop circuit with two mutually inverse outputs, one of which will light a lamp when the test shows a good device and the other of which will light a lamp when it shows a faulty device. Then, to prevent either lamp from being lighted except when the engine is warmed up and running in the predetermined speed range, logic circuits are provided to block the operation of the lamps by the flipflop circuit except when the engine temperature exceeds the minimum normal operating temperature and at the same time the engine is running in the predetermined speed range.

A gate may be interposed between the pulse duration comparison circuit and the flipflop circuit, so that the flipflop will be set in a manner such as to energize the "bad" indicator only if the engine is warmed up and running in the predetermined speed range.

In the test circuit of this invention it is assumed that the electronic control circuit producing the fuel injection pulses is in proper working order. This raises no problems, because a previous testing step in which the electronic control circuit for fuel injection is itself checked can readily be provided in the course of motor vehicle inspection so that it can safely be assured that the electronic control system is properly operating in the intake air measurement test.

In the apparatus of the invention the comparison of the injection pulse duration and of the engine speed with the respective prescribed ranges for a successful test is accomplished with the use of pulse duration analog converters for converting, in the one case, fuel injection pulses and, in the other case, pulses of a length proportional to engine speed, such as are produced by the interruptor of an ignition system, into d.c. voltages respectively representative of the intake air quantity measurement and of the engine speed. These d.c. voltages are then supplied to a two-threshold switch of the type that produces an output of one value when the input d.c. voltage is at a value between the two thresholds and an output of another value when the input d.c. voltage is outside of the range between the two thresholds.

The invention is further described by way of example with reference to the single FIGURE of the annexed drawing which is a diagram, partly in block form and partly in logic form, of a test apparatus according to the invention connected to an electronically controlled fuel injection system containing the intake air quantity measuring device under test.

At the upper left of the drawing is an adjustable tapped resistor 1 connected as a potentiometer between a voltage source 1a and ground or chassis potential. The tap of the potentiometer is arranged to be displaced by the measuring flap of an intake air quantity measuring device not shown in the drawing. The tap of the potentiometer 1 is connected electrically to an input of an electronic control circuit 2 that operates to determine the duration of the injection control pulses for a fuel injection valve 3. The electronic control circuit 2 has another input that is provided with a signal representative of engine speed, derived from the ignition system 4 of the engine. The electronic control circuit operates to form the quotient obtainable by dividing the signal representative of intake air quantity by the signal representative of engine speed, such quotient then being utilized to determine the duration of the fuel injection control pulses for the fuel injection valve 3, so that this duration will be proportional to the aforesaid quotient. These pulses, and hence in effect this quotient, are also furnished, through the terminal 5a of the test equipment, to the pulse duration analog converter 5 which forms as an output a d.c. voltage signal of a magnitude proportional to the duration of the fuel injection control pulses. This output is provided to a first threshold switch of the kind that has two voltage thresholds and provides an input of one value when the input voltage is in the range between the two voltage thresholds and of another value when the input voltage is outside that range. Circuits for such threshold switches are well known and, furthermore, such a switch may be made up of two single-threshold switches followed by a logic gate (an AND-gate, provided that the polarity of the threshold switch outputs are properly arranged, with the interposition of an inverter if necessary).

The range of voltage between the thresholds of the threshold switch corresponds to a predetermined tolerance band around the desired value of the fuel injection pulse duration when the operating temperature of the engine is above minimum normal operating temperature and the engine speed is within the predetermined test range. Since it is assumed that the electronic control is in working order, the voltage range between the thresholds of the threshold switch also corresponds to the correct measurement of intake air quantity within the predetermined tolerance range.

In the example shown in the drawing, a 0-signal is produced at the output of the threshold switch 6 whenever the d.c. voltage output of the pulse duration analog converter 5 is within the tolerance limits provided by the thresholds of the threshold switch, whereas a 1-signal is produced at the output of the threshold switch 6 when the output voltage of the pulse duration analog converter is at a value outside these tolerance limits. The output of the threshold switch 6 is connected to the input 7 of an AND-gate 8. A second input 9 of the AND-gate 8 is connected to the output of a second threshold switch 10 that likewise has two thresholds and provides an output signal of one value when the input voltage is in the range of voltages between these two thresholds and an output signal of a second value when the input voltage is outside the range between the two thresholds. The input to the second threshold switch 10 is the output of a second pulse duration analog converter 11 which receives over input terminal 11a of the test set pulses of a duration representative of engine speed, these being supplied from the ignition system 4 of the engine. These pulses have such a duration because they are produced by the interruptor contacts 12 of the ignition system. The pulse duration analog converter 11 accordingly produces an output voltage of a magnitude that is representative of engine speed. The thresholds of the threshold switch 10 are set, for example, at voltages corresponding respectively to 1500 r.p.m. and 4500 r.p.m. If the engine speed is in the range between these values, a 1-signal appears at the output of the second threshold switch 10, whereas if the engine speed is outside of this range a 0-signal appears at the output of the switch 10.

A third input 13 of the gate 8 is connected to the output of a third threshold switch 14, to the input of which a temperature sensor 15 is connected. The latter is indicated in the diagram as a temperature sensitive resistor connected in a voltage divider between the terminal 1a connected to a voltage source (not shown) and ground or chassis. The threshold switch 14 is so constituted as to provide a 1-signal at its output when the minimum normal operating temperature of the engine is reached or exceeded and a 0-signal when the engine temperature is below that minimum operating temperature. Thus, while the engine is warming up from a cold start, a 0-signal will be produced at the output of the third threshold switch 14. The outputs of the second and third threshold switches are, furthermore, connected to a second AND-gate 16.

The output of the first AND-gate 8 is connected to a control input of a bistable flipflop circuit 17. If now 1-signals are present at each of the inputs 7,9 and 13 of the first AND-gate 8, this signifies that the injection pulse duration, and hence the air intake measurement, is not within the prescribed tolerance range, and the resulting signal at the output of the AND-gate 8 then causes the flipflop circuit 17 to produce a 0-signal at its first output 18 and a 1-signal at its second output 19. The 1-signals present at inputs 9 and 13 of the first AND-gate 8 also appear at the inputs of the second AND-gate 16, which applies an output to an input of each of the third and fourth AND-gates 20 and 21 through which the outputs 18 and 19 of the bistable flipflop circuit 17 must pass to reach the indicators 23 and 24. Under the conditions just mentioned, the signal applied by the output of the second AND-gate 16 enables both of the AND-gates 20 and 21, so that whichever of them is provided with a 1-signal by the bistable flipflop circuit 17 will provide an output to the corresponding indicator 23 or 24, which may be a signal lamp. Since the outputs 18 and 19 of the bistable flipflop circuit 17 are mutually inverse, only one of the signal lamps can be lit at a time. If the output of either the second threshold switch 10 or the third threshold switch 14 is a 0-signal, the second AND-gate 16 will not provide an enabling signal to the third and fourth AND-gates 20 and 21 and neither of the lamps 22 and 23 will be lit. If the AND-gate 16 were not provided, a 0-signal from second threshold switch 10 or from third threshold switch 14 would cause the flipflop circuit 17 to have the same output as would be caused by an 0-signal from the first threshold switch 6, thus the output indicating a good test.

There is some redundance in providing the outputs of the second and third threshold switches 10 and 14 to gate 8 as well as to gate 16, which may have its uses in providing additional assurance against indicating a "bad" test when the desired conditions for the test are not obtained. If this redundance is not desired, the gate 8 can be dispensed with, leaving entirely to the gates 16, 20 and 21 the prevention of any output indication when the test conditions are not those desired. In such a case the output of the first threshold switch 6 could directly control the input of the flipflop circuit 17, and the gates 20 and 21 would be sufficient to provide one distinctive logic output when the engine temperature, the engine speed and the fuel injection pulse width are all in the desired range and another distinctive logic output when the engine temperature and the engine speed are in the desired range, but the fuel injection pulse duration is not within the desired range.

The polarity of the output of the threshold switch 6 need not be as described in connection with the circuit illustrated in the drawing. This is particularly clear in the case just mentioned in which the gate 8 is omitted and the output of the threshold switch 6 directly controls the flipflop circuit 17, because the flipflop circuit 17 operates in this case merely to derive two mutually inverse signals from the output of the threshold switch, one of these signals, at the output 18 of the threshold switch, being simply a replica of the threshold switch output and the other, at the output 19 of the flipflop circuit, being the logical inverse of the threshold switch output. Hence, if the threshold switch produced a 1-signal when the fuel injection pulse duration is within the desired range, instead of a 0-signal as previously postulated, the result would merely be to require the input connections to the "good" and "bad" test lamps to be interchanged. This consideration also makes clear that instead of the flipflop circuit 17, a simple inverter could be used to derive a signal from the threshold switch 6 for furnishing to the gate 21, while the threshold switch 6 could directly furnish an input to the gate 20. It will thus be apparent that although the invention has been described with respect to a specific example, modifications and variations are possible within the inventive concept.

We claim:

1. A method of testing the accuracy of a device that measures the intake air of an internal combustion engine in which the amount of fuel injection is controlled by generating a pulse signal for the fuel injector having a duration proportional to the quotient formed by dividing the intake air quantity measured by said device by the engine speed as derived from the engine ignition system, which method comprises the steps of:

comparing the duration of fuel injection control pulses with a standard value range and generating a first circuit logic condition having a first value when said pulse duration is within said predetermined range and a second value when it is outside said predetermined range;

comparing engine temperature with a predetermined range of temperature and thereby generating a second circuit logic condition having a first value when said engine temperature is within said predetermined range and having a second value when it is outside of said predetermined range;

comparing engine speed with a predetermined engine speed range and thereby generating a third circuit logic condition having a first value when said engine speed is within said predetermined range and a second value when it is outside said predetermined range;

generating a combinational logic condition having a first value when said second and third circuit logic conditions both have their first values, said second combinational logic condition having a second value in all other cases, operating one and only one of a pair of indicators whenever said combinational logic condition has its first value, a first indicator of said pair being operated when said first circuit logic condition has its first value and the second indicator of said pair being operated when said first circuit logic condition has its second value, and neither of them being operated when said combinational logic condition has its second value.

2. Apparatus for testing the accuracy of an intake air measurement device of a fuel injection type internal combustion engine having electronic fuel injection control means producing fuel injection control pulses having a duration proportional to the quotient of intake air quantity measured by said device divided by engine speed, which apparatus comprises:

pulse duration analog conversion means (5) for producing a first analog d.c. voltage in accordance with the duration of said fuel injection control pulses;

a threshold switch (6) having a lower and an upper threshold defining a predetermined voltage range and connected to produce an output signal having a first value when the output of said pulse duration analog converter is within said predetermined voltage range and having a second value when the output of said pulse duration analog converter is outside said predetermined voltage range;

temperature sensor means (15) having an electrical output representative of engine temperature;

engine speed responsive means (11) having an electrical output representative of engine speed;

first gate means (16) responsive to the output of said temperature sensor means and said engine speed responsive means for providing an output which has a first value when the output of said temperature sensor means is representative of a temperature in a predetermined range of engine temperature and at the same time the output of said engine speed responsive means is representative of a speed in a predetermined range of engine speeds, and additional gate means (8,20,21) responsive to the outputs of said threshold switch, said temperature sensor means and said engine speed responsive means for providing a first output which has a distinctive value when the output of said threshold switch is at its aforesaid first value and at the same time the output of said temperature sensor means is representative of a temperature in said predetermined range of engine temperature and the output of said engine speed responsive means is representative of a speed in said predetermined range of engine speeds, and for providing a second output which has a distinctive value when the output of said threshold switch is at its aforesaid second value and at the same time the output of said temperature sensor is representative of a temperature in said predetermined range of engine temperature and the output of said engine speed responsive means is representative of a speed in said predetermined range of engine speeds.

3. Apparatus as defined in claim 2 in which said engine speed responsive means comprises:

means for generating a d.c. voltage representative of engine speed and a second threshold switch (10) having two thresholds defining a voltage range and connected to produce an output having a first value when said d.c. voltage is within said voltage range and a second value when said d.c. voltage is outside said voltage range.

4. Apparatus as defined in claim 2 in which said temperature sensor means comprises temperature responsive means for generating a d.c. voltage representative of engine temperature (15) and a third threshold switch (14) having an input voltage threshold at the voltage produced by said temperature responsive means at the minimum engine operating temperature of said engine, said predetermined temperature range specified in claim 2 being accordingly the range for engine temperatures above said minimum operating temperature.

5. Apparatus as defined in claim 2 in which:

said engine speed responsive means comprises means for generating a d.c. voltage representative of engine speed and a second threshold switch (10) having two thresholds defining a voltage range and connected to produce an output having a first value when said d.c. voltage is within said voltage range and a second value when said d.c. voltage is outside said voltage range;

said temperature sensor means comprises means for generating a d.c. voltage representative of engine temperature (15) and a third threshold switch (14) having an input voltage threshold at the voltage produced by said temperature responsive means at the minimum engine operating temperature of said engine, said predetermined temperatue range specified in claim 2 being accordingly the range for engine temperatures above said minimum operating temperature;

said first gate means comprises an AND-gate (16) having as inputs the outputs of said second (10) and third (14) threshold switches, and said additional gate means comprises second (20) and third (21) AND-gates both having the output of said first gate means (16) as one input and having as a second input, signals respectively representative of the output of said threshold switch and the logical inverse thereof, at least during the time when the output of said first gate means is at its aforesaid first value.

6. Apparatus as defined in claim 5 in which said second inputs of said third and fourth AND gates are supplied by a bistable flipflop circuit having two mutually inverse outputs, and in which further, two indicator means are provided respectively operable in response to the respective conditions of the outputs of third and fourth AND gates.

7. Apparatus as defined in claim 6 in which said additional gate means comprises a fourth AND-gate (8) having inputs respectively responsive to the outputs of said first (6), second (10) and third (14) threshold switches and an output connected to a control input of said bistable flipflop circuit (17).

* * * * *